Oct. 16, 1928. 1,687,756
J. W. FOLEY
ROLLER BEARING
Filed March 14, 1927 2 Sheets-Sheet 2

Inventor:
John W. Foley

Patented Oct. 16, 1928.

1,687,756

UNITED STATES PATENT OFFICE.

JOHN W. FOLEY, OF CHICAGO, ILLINOIS.

ROLLER BEARING.

Application filed March 14, 1927. Serial No 175,031.

This invention relates to improvements in roller bearings, and one of the objects of the invention is to provide an improved bearing of this character having means for reducing to a minimum both radial and thrust friction between the parts.

Figure 1:
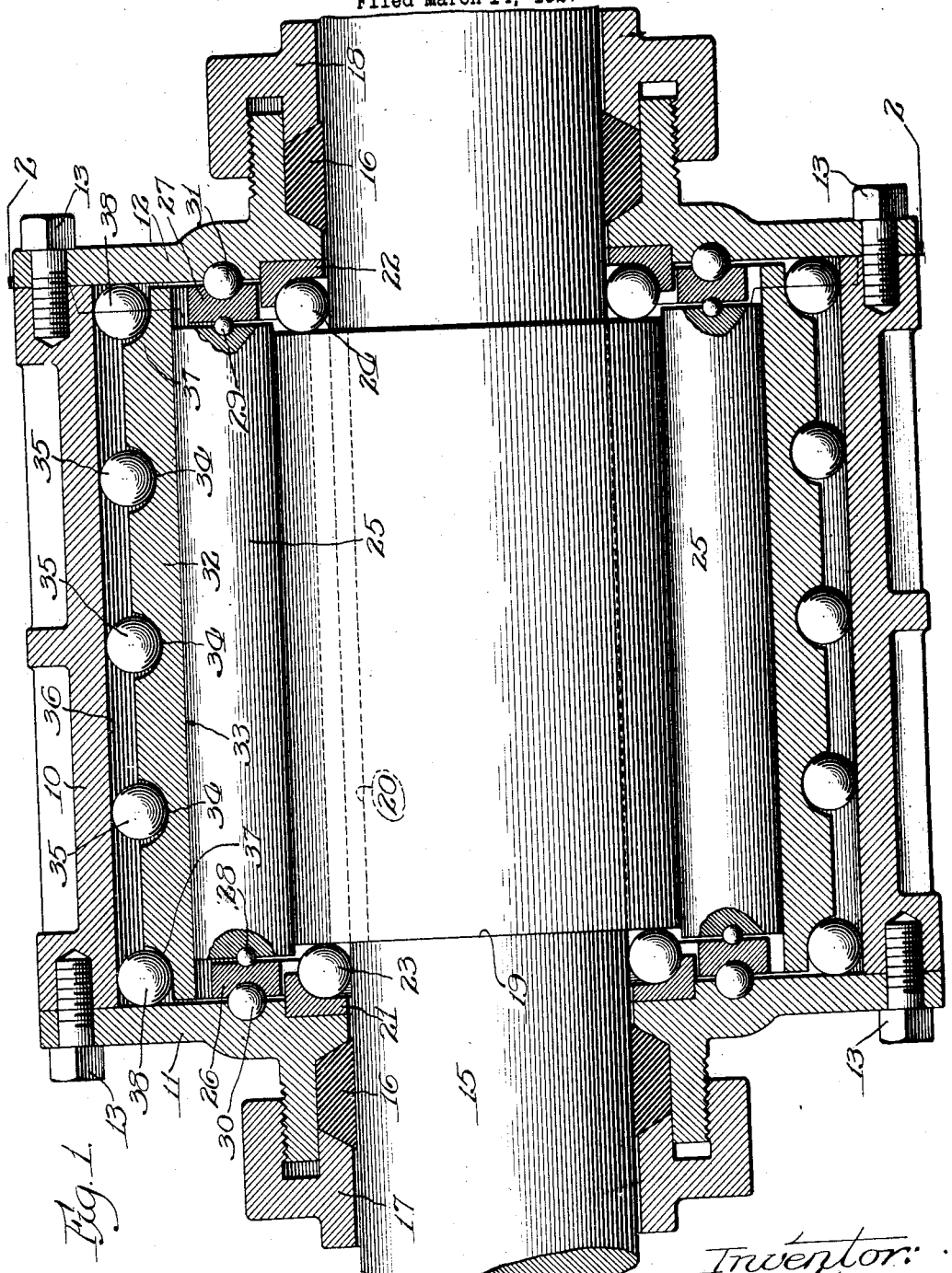

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a longitudinal sectional view of a bearing of this character constructed in accordance with the principles of this invention.

Figure 2:
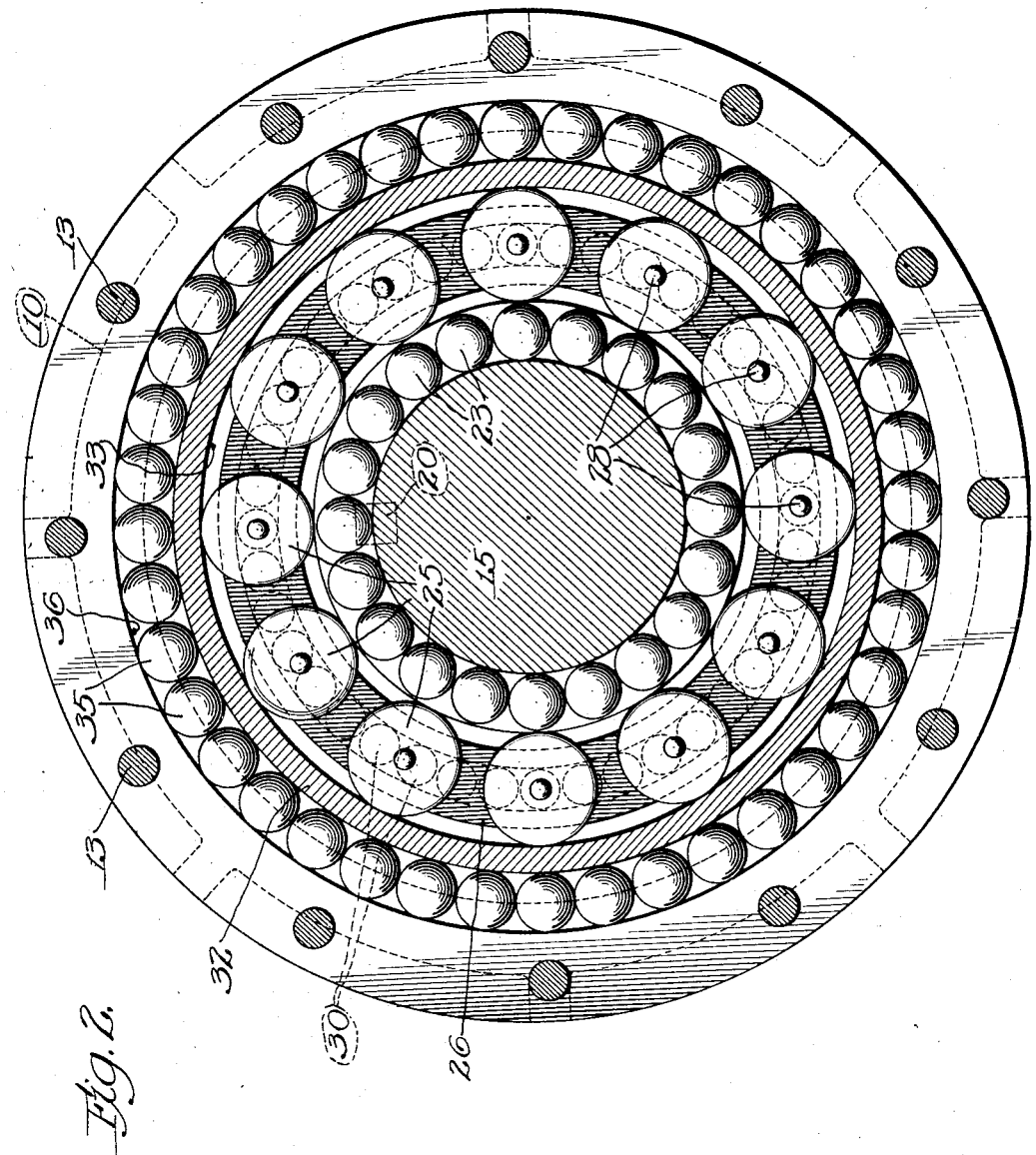

Figure 2 is a transverse sectional view taken on line 2—2, Figure 1.

Referring more particularly to the drawings the numeral 10 designates a casing, having end walls 11—12 which are secured in position in any suitable manner, such as by means of fastening bolts 13, whereby the end walls may be removed when desired.

Projecting into the casing and through the end walls is a shaft 15, which has bearings in the end members 11 and 12 and the end members are shaped to receive packing 16 which is held in position by means of packing nuts 17—18 encompassing the shaft and having threaded engagement with the respective end members 11 and 12.

Encompassing the shaft 15 is a sleeve 19 which is secured thereto for rotation therewith in any suitable manner such as by means of a key or fastening device 20. This sleeve 19 is of an external diameter considerably greater than the diameter of the shaft 15 and the ends of the sleeve 19 terminate short of the end walls 11 and 12. Bearing members 21—22 are provided against the respective end walls 11, and balls 23—24 are arranged between the respective bearing members 21—22 and the adjacent ends of the sleeve 19 to provide end thrust bearings for the sleeve.

Encompassing the sleeve 19 and having rolling contact therewith are a plurality of elongated rollers 25 which are of a length somewhat less than the length of the casing and may be of any desired diameter. Arranged between the ends of the rollers 25 and the respective end members 11 and 12 of the casing are annular members 26—27, and balls 28—29 are arranged between the ends of the rollers 25 and the adjacent faces of the annular members 26—27 and have free rolling contact therewith.

Balls 30—31 are arranged between the annular members 26—27 and the respective end members 11 and 12 and have free rolling contact with each.

These annular members and the ball bearings co-operating therewith form end thrust bearings for the rollers 25.

Encompassing the rollers 25 is a sleeve 32 with the inner face 33 of which the rollers 25 have rolling contact.

The sleeve 32 is preferably of a length substantially equal to the length of the casing and is provided with a plurality of circumferential grooves 34 opening through the periphery thereof and intermediate the ends of the sleeve. These grooves 34 are spaced from each other for any desired distance in directions lengthwise of the longitudinal axis of the sleeve, and balls 35 are provided, which are seated and roll within the grooves 34, and also have rolling contact with the inner surface 36 of the casing 10.

The grooves 34 maintain the balls in position and spaced longitudinally of the sleeve, while at the same time the balls have free rolling movement with respect to each other and also circumferentially about the sleeve 32.

The ends of the sleeve adjacent the end walls 11—12 are preferably grooved as at 37 to receive balls 38, which latter roll in the grooves 37 and also have contact with the inner face 36 of the housing and with the inner faces of the respective end members 11 and 12. These balls 38 provide end thrust bearings for the sleeve 32.

With this improved construction it will be manifest that all of the parts of the bearing are free to rotate within the housing and the balls together with the rollers being independent of each other will rotate independently, and the sleeve 32 will float within the casing.

This will result in a very sensitive bearing and will reduce to a minimum the radial as well as the longitudinal friction and end thrust of the parts.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A roller bearing embodying a casing, a shaft projecting thereinto, a bearing surface carried by the shaft within the casing, rollers encompassing said surface and having a rolling contact therewith, a freely rotatable sleeve encompassing said rollers and with the inner face of which sleeves said rollers have a rolling contact, and a plurality of series of balls extending circumferentially about the sleeve and having rolling contact with the outer periphery of the sleeve and the casing wall.

2. A roller bearing embodying a casing, a shaft projecting thereinto, a bearing surface carried by the shaft within the casing, rollers encompassing said surface and having a rolling contact therewith, a freely rotatable sleeve encompassing said rollers and with the inner face of which sleeve said rollers have a rolling contact, and a plurality of series of balls extending circumferentially about the sleeve and having rolling contact with the outer periphery of the sleeve and the casing wall, the balls of the respective series being independent of each other and each of the respective series being independent of the other series.

3. A roller bearing embodying a casing, a shaft projecting thereinto, a bearing surface carried by the shaft within the casing, rollers encompassing said surface and having a rolling contact therewith, a freely rotatable sleeve encompassing said rollers and with the inner face of which sleeve said rollers having a rolling contact, a plurality of series of balls encompassing the said sleeve and having rolling contact therewith and with the casing wall, the said series being independent of each other and the balls of each series being independent, and means maintaining the said series spaced from each other in directions lengthwise of the longitudinal axis of the sleeve.

4. A roller bearing embodying a casing, a shaft projecting thereinto, a bearing surface carried by the shaft within the casing, a series of rollers contacting with and extending about said surface, a freely rotatable sleeve encompassing the rollers and with the inner surface of which sleeve the rollers have rolling contact, a circumferential groove in the periphery of the sleeve, a plurality of independent balls rolling in said groove and having a rolling contact with the surrounding wall of said casing, and a series of balls adjacent each end of the sleeve, each of the last recited series embodying rollers independent of each other and having rolling contact with the sleeve and with two of the walls of said casing.

5. A roller bearing embodying a casing, a shaft projecting thereinto, a bearing surface carried by the shaft within the casing, a series of rollers encompassing and having rolling contact with said surface, a sleeve encompassing said series of rollers and with the inner surface of which sleeve said rollers have rolling contact, a plurality of circumferential grooves opening through the periphery of the sleeve and spaced in directions lengthwise of the longitudinal axis of the sleeve, and a series of independent balls rolling in each of the grooves and also having rolling contact with the surrounding wall of the casing, the series of balls adjacent each end of the sleeve having rolling contact with both the surrounding wall and the respective adjacent end walls of the casing.

In testimony whereof I have signed my name to this specification, on this 11th day of March, A. D. 1927.

JOHN W. FOLEY.